United States Patent Office 2,940,474
Patented June 14, 1960

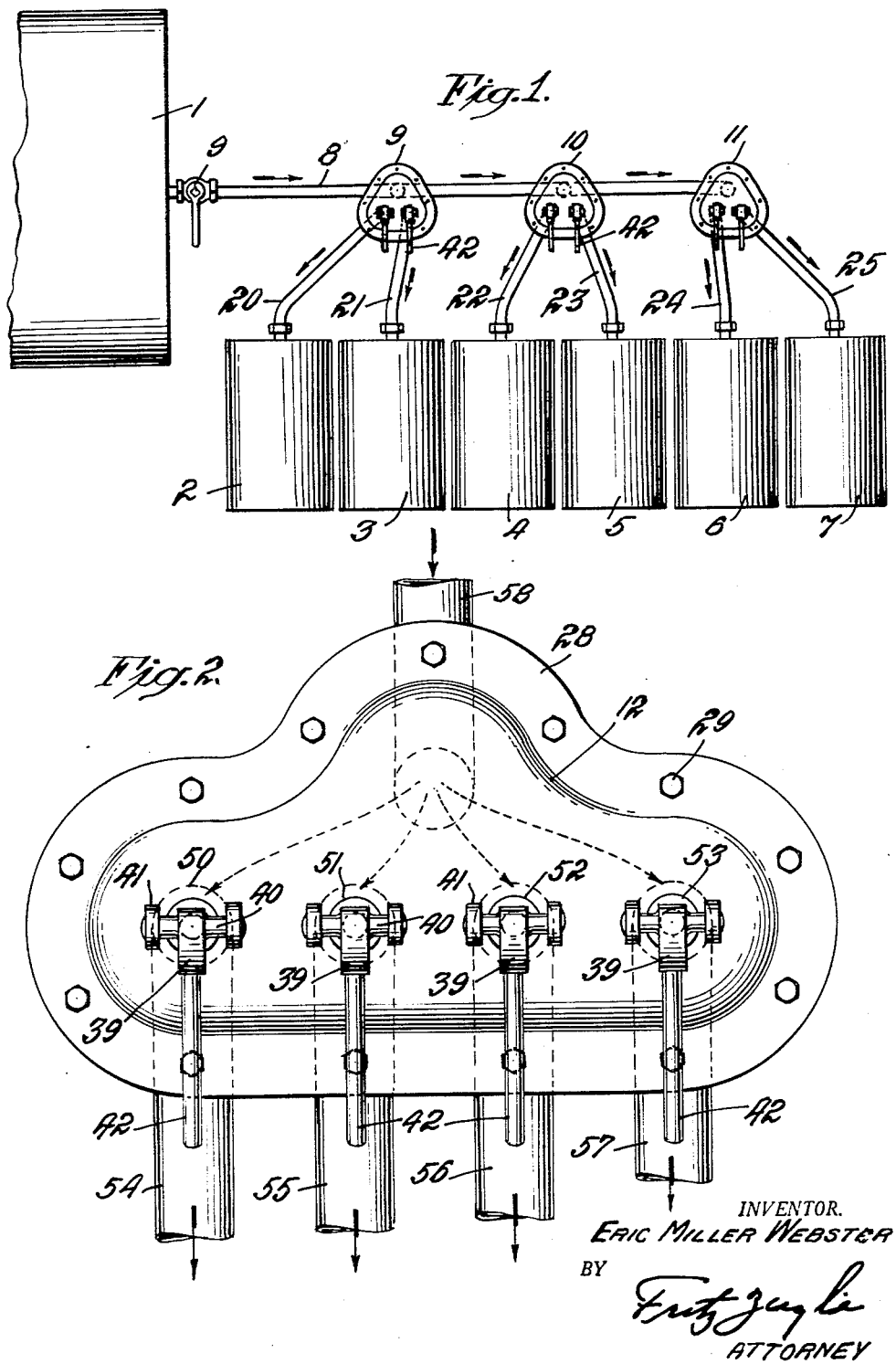

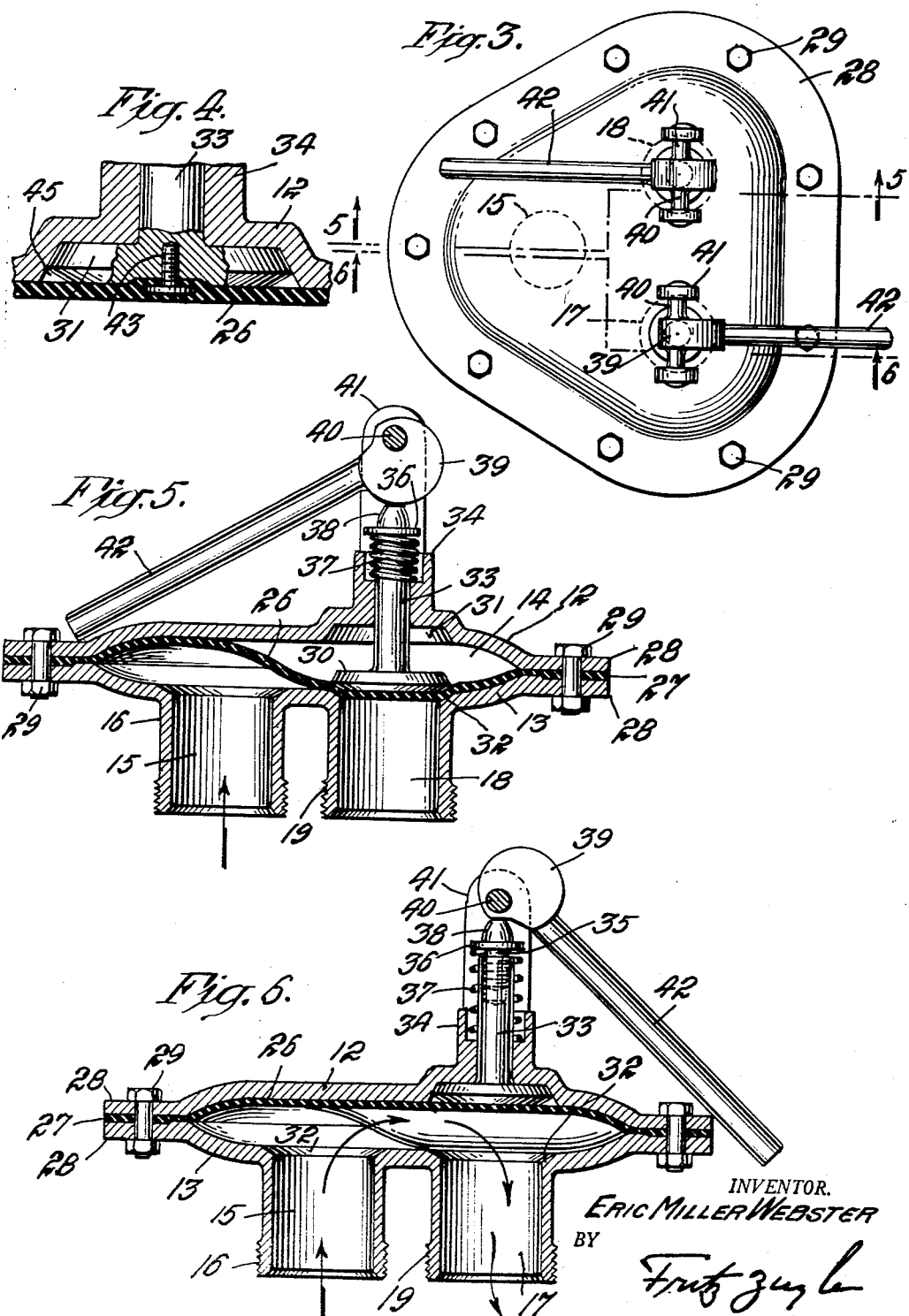

2,940,474

MULTI-PORT VALVES

Eric Miller Webster, 21 Old Farm Road,
Lake Success, N.Y.

Filed May 24, 1956, Ser. No. 587,051

1 Claim. (Cl. 137—612.1)

This invention relates to multi-port valve structures of the character adapted for use in milk lines such as are employed in the dairy industry, and for the transference or conduct of other fluids.

It is an object of the invention to provide a valve which may be readily cleansed without requiring its disassembly; which shall be of sturdy construction and composed of noncontaminating materials, and which shall be effective in operation.

More particularly, the invention contemplates the provision of a housing having inlet and outlet ports, with the outlet ports provided with a valve seat against which a movable valve is adapted to seat, and in the provision of a diaphragm of flexible material extending over all of the ports and attached to the valve and adapted to be interposed between the valve and its seat, and seated against the seat when the valve is closed. The invention contemplates the provision of numerous other features to be detailed at length hereafter and stated in the claims appended hereto.

With the above-stated objects, and other objects to be herinafter set forth in view, I have devised the arrangement of parts to be described and more particularly pointed out in the claim attached hereto.

In the accompanying drawings, wherein an illustrative embodiment of the invention is disclosed, Fig. 1 shows how a plurality of the valves are incorporated in a pipe line between a main tank and a plurality of receptacles to be filled;

Fig. 2 is a front elevational view of a valve structure in which a plurality of outlet ports is incorporated, with a controlling valve for each of the same;

Fig. 3 is a front elevational view of one of the valve structures as incorporated in the pipe line shown in Fig. 1;

Fig. 4 is a sectional view through a portion of the valve housing and the valve movable therein, showing how the diaphragm is attached to the head of the valve;

Fig. 5 is a sectional view, taken substantially on the line 5—5 of Fig. 3, looking in the direction of the arrows, and Fig. 6 is a sectional view, taken substantially on the line 6—6 of Fig. 3, looking in the direction of the arrows.

Referring to the drawings, and more particularly to Fig. 1 thereof, 1 indicates a tank containing milk or other fluid and which might be on a truck or trailer, its contents being adapted for transference by way of piping, to a plurality of receptacles, containers or smaller tanks indicated at 2, 3, 4, 5, 6 and 7. A manifold pipe 8 extends from the tank 1 and the flow of milk or other fluid from the tank 1 through the manifold is controlled by the valve 9. Connected to the manifold pipe 8 is a plurality of valve structures indicated respectively at 9, 10 and 11. Reference is now to be had to Figs. 3 to 6 inclusive, wherein the construction of each of these valve structures is clearly disclosed.

Each of the valve structures includes a housing composed of a pair of facially connected dished plates or housing members indicated respectively at 12 and 13. These housing members or halves have their concave or dished faces facing one another to thereby provide the chamber 14 between them. The housing section or half indicated at 13 is provided with an inlet port 15 defined by a threaded nipple 16 by which it may be connected to piping to thereby couple the port 15 to the manifold 8 or to some other source of fluid supply.

In the embodiment of the invention shown in Figs. 1 and 3 to 6 inclusive, the housing section 13 is provided with two outlet ports indicated respectively at 17 and 18. Each of these ports is defined by a nipple 19 by means of which the port 17, in the case of the valve 9 in Fig. 1, can be connected to an outlet pipe 20 leading to the container or receptacle 2. Similarly, the outlet port 18 may be connected by an outlet pipe 21 to the container or receptacle shown at 3. In like manner the outlet port 17 of valve structure 10 is connected by pipe 22 to container or receptacle 4 while the outlet port 18 of this valve structure is connected by pipe 23 to the container or receptacle 5. In the case of the value structure 11, the outlet port 17 thereof is connected by the pipe 24 to the container or receptacle 6, while the outlet port 18 is connected by the pipe 25 to the container or receptacle 7.

Extended across the interior of the valve housing and within the chamber 14 thereof is a flexible diaphragm 26 which is preferably composed of neoprene or a non-contaminating material of similar nature. The marginal edge portion 27 of the diaphragm 26 is sandwiched and clamped between the peripheral flanges 28 of the housing sections 12 and 13. Bolts 29 clamp the flanges 28 and the edge portion 27 of the diaphragm 26 in the relationship clearly shown in Figs. 5 and 6.

A valve, generally indicated at 30, is provided for each of the outlet ports 17 and 18, said valve being provided with a head 31 adapted to seat against a seat 32 provided on the inner end of each of the outlet ports 17 and 18. It is to be noted that the diaphragm 26 is interposed between the head 31 of the valve and the seat 32 so that when the valve is seated or closed, as shown in Fig. 5, the valve head does not actually contact with the seat 32 but rather forces the diaphragm 26 against the seat.

The valve 30 is provided with a stem 33 which is slidably movable through a guide 34 provided on the housing section 12. The valve stem 33 is adjustable in length to thereby regulate the pressure imposed on the diaphragm in seating it. The adjustability of the effective length of the valve stem is attained by a threadable stem-extension 35 which threads into the end of the stem, said extension being provided with a collar 36 against which one end of a coil spring 37 is operative to bias the valve toward its open position and to maintain the nose portion 38 of extension 35 against the periphery of the valve-closing cam shown at 39. The cam 39 is fixed upon a shaft or spindle 40, mounted for oscillatory movement in a clevis 41, forming an upward extension of the valve guide 34 on the housing section 12. The valve guide 34 is provided with a seat against which one end of the coil spring 37 rests. An operating handle or rod 42 has one end attached to the cam 39.

As will be clearly seen in Fig. 4, the diaphragm 26 is attached to the head 31 of the valve 30, this attachment being effected by means of the screw 43 which has its head embedded in and enclosed by the material of the diaphragm. It will thus be obvious that by this attachment of the diaphragm to the valve head 31, a movement of the valve head away from the seat 32 will bring the diaphragm with it thus bringing the diaphragm to open position, as clearly shown in Fig. 6.

From the foregoing, the operation of the improved valve construction will now be apparent. When it is desired to close either or both of the outlet ports 17 and 18, the valve 30 for the port to be closed is moved to the closed position shown in Fig. 5, by swing of the handle 42 in the required direction to cause cam 39 to force the valve 30 toward the seat 32 and clampingly position a portion of the diaphragm between the head of the valve and the seat 32, thus effectively closing the outlet port. To open the valve merely requires a swing of the handle 42 in the opposite direction, as shown in Fig. 6, the spring 37 causing movement of the valve away from the seat and consequent lifting of the diaphragm 26 away from the seat 32, so that fluid entering through the inlet port 15 may now pass out through the outlet port or ports from which the valves and diaphragm have been lifted. While there are several outlet ports in each valve housing, it will be apparent that the closures for each of said ports are independently controllable. This will be apparent from Fig. 3, wherein the valve for the outlet port 18 is closed while that for outlet 17 is in the open position shown in Fig. 6. In its raised or open position the head 31 of the valve 30 seats in a recess 45 provided in the housing section 12, thereby enabling the diaphragm to smoothly follow the curvature of the inner wall surface of chamber 14, as shown in Fig. 6.

In the embodiment of the invention shown in Figs. 1 and 3 to 6 inclusive, the valve housing is shown as provided with two outlet ports, each controlled by its own valve yet sealed by the same single diaphragm. As will be noted in Fig. 2, the number of outlet ports may be materially increased, for therein four outlet ports, indicated respectively at 50, 51, 52 and 53, are shown. Outlet pipe 54 leads from outlet port 50 to a suitable receptacle; outlet pipe 55 leads from port 41 to another receptacle; outlet pipe 56 leads from port 52 to a third receptacle and outlet pipe 57 leads to a fourth receptacle. It will of course be understood that the outlet pipes 54 to 57 need not lead to receptacles, but can be coupled to piping or to other chambers or containers into which the fluid is to be deposited. The valve housing and valve construction of the embodiment shown in Fig. 2 is otherwise similar to that of the embodiment shown in Figs. 1 and 3 to 6 inclusive. A single inlet port enters into the housing of the valve structure shown in Fig. 2.

The structure described is one which is easily cleaned by flushing it with a suitable cleaning solution without requiring dismantling, and the device will be found reliable and unfailing in operation.

Having described an embodiment of the invention, it is obvious that the same is not to be restricted thereto, but is broad enough to cover all structures coming within the scope of the annexed claim.

What I claim is:

In a valve structure, a housing composed of a pair of dished plates arranged in facial disposition, an inlet port in one of the plates, a plurality of outlet ports in the said plate, a single flexible diaphragm disposed between the plates and having its marginal edge portion clamped between edge portions of the plates, said diaphragm being otherwise unsecured to and unrestrained by the plates and being of a size to cause it to extend over all of the ports, valves arranged adjacent to all of the outlet ports, each of said valves being attached to the diaphragm, spring means operative on the valves for biasing the same away from the outlet ports thereby causing said valves to hold the diaphragm away from such ports, the diaphragm being interposed between the valves and the ports, valve-operating means capable of independent operation to cause any one of the valves to be moved toward the port with which it is related, said movement flexing the diaphragm and causing it to close the port over which the valve has been used, such movement unaffecting the other valves and the portions of the diaphragm which are connected to such valves.

References Cited in the file of this patent

UNITED STATES PATENTS

| 406,950 | Parsons | July 16, 1889 |
| 766,420 | Calley | Aug. 2, 1904 |
| 1,773,726 | Deming | Aug. 26, 1930 |
| 2,211,167 | Safford | Aug. 13, 1940 |
| 2,497,557 | Reeves | Feb. 14, 1950 |
| 2,562,631 | Morrison | July 31, 1951 |
| 2,579,982 | Trump | Dec. 25, 1951 |
| 2,654,559 | Franck | Oct. 6, 1953 |
| 2,677,390 | Davis | May 4, 1954 |
| 2,702,051 | Welty | Feb. 15, 1955 |

FOREIGN PATENTS

| 94,220 | France | Mar. 2, 1872 |
| 429,244 | France | July 11, 1911 |